(12) United States Patent
Wojtkowski et al.

(10) Patent No.: US 7,461,532 B2
(45) Date of Patent: Dec. 9, 2008

(54) MONITORING AND ALARM SYSTEM FOR ROLLING MILL OIL FILM BEARINGS

(75) Inventors: Thomas Wojtkowski, Shrewsbury, MA (US); Gabriel Royo, Southborough, MA (US); Peter Osgood, Upton, MA (US); Earl Winslow, Grafton, MA (US)

(73) Assignee: Morgan Construction Company, Worcester, MA (US)

( * ) Notice: Subject to any disclaimer, the term of this patent is extended or adjusted under 35 U.S.C. 154(b) by 5 days.

(21) Appl. No.: 11/334,124

(22) Filed: Jan. 18, 2006

(65) Prior Publication Data

US 2006/0180394 A1  Aug. 17, 2006

(51) Int. Cl.
  *B21B 27/06* (2006.01)
  *B21B 45/02* (2006.01)
  *B21B 37/74* (2006.01)
  *B21B 37/16* (2006.01)

(52) U.S. Cl. .............................. 72/236; 72/8.1; 72/8.5; 72/44

(58) Field of Classification Search .................. 72/236, 72/7.2, 8.1, 8.5, 9.5, 10.1, 10.8, 11.3, 12.2, 72/13.2, 133, 14.3, 14.5, 1, 31.01, 31.07, 72/41–45; 73/862.55, 862.541; 340/682
See application file for complete search history.

(56) References Cited

U.S. PATENT DOCUMENTS 1,858,788 A * 5/1932 Rohn .......................... 72/13.2
2,113,050 A * 4/1938 Iversen ........................ 72/236
2,243,010 A * 5/1941 Iversen ........................ 72/200
3,064,509 A * 11/1962 Ford et al. .................... 72/6.2
3,934,678 A * 1/1976 Jennings .................. 184/103.1
4,376,389 A   3/1983 Inoue et al.
4,406,169 A * 9/1983 Ikeuchi et al. ........... 73/862.541
4,460,893 A * 7/1984 Thomas et al. .............. 340/682
4,944,609 A   7/1990 Salter, Jr. et al.
6,149,309 A  11/2000 Wojtkowski, Jr. et al.

FOREIGN PATENT DOCUMENTS

| JP | 57082742 |   | 5/1982 |
| JP | 58182534 |   | 10/1983 |
| JP | 60046803 |   | 3/1985 |
| JP | 61007008 | A * | 1/1986 |
| JP | 61198057 |   | 9/1986 |

* cited by examiner

*Primary Examiner*—Dana Ross
*Assistant Examiner*—Teresa Bonk
(74) *Attorney, Agent, or Firm*—Gauthier & Connors LLP

(57) ABSTRACT

A monitoring and alarm system is disclosed for a rolling mill in which oil is pumped from a reservoir via feed piping and branch feed lines to oil film bearings and oil is returned from the bearings via branch drain lines and return piping to the reservoir. The system comprises sensors positioned in at least one of the branch feed lines, the branch return lines and the bearings. The sensors are operative to sense diverse parameters indicative of bearing operating conditions and to generate status signals representative thereof. A controller evaluates the status signals and triggers warning signals when the status signals indicate that the bearings are in danger of being damaged by continued operation. Alarms respond to the warning signals and alert mill operating personnel to such danger.

7 Claims, 2 Drawing Sheets

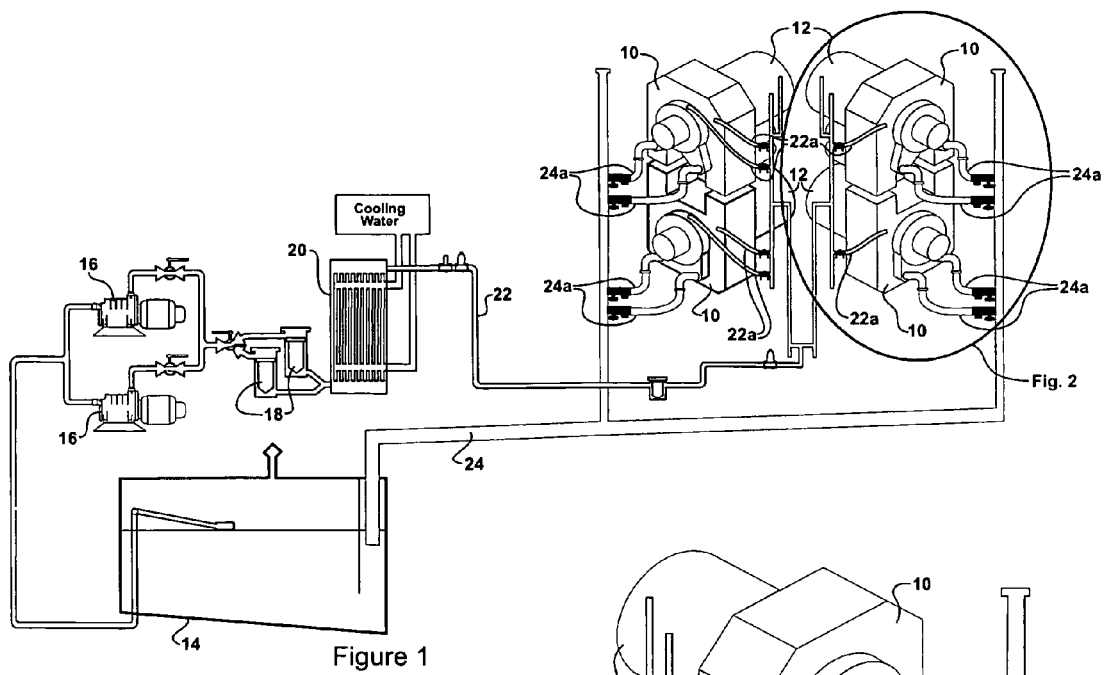
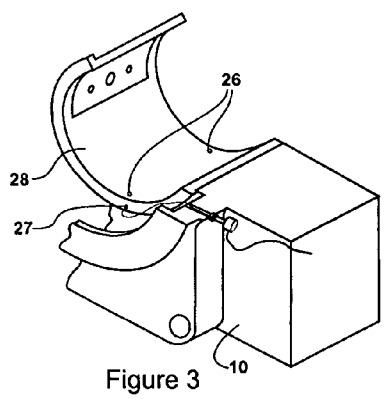
Figure 3
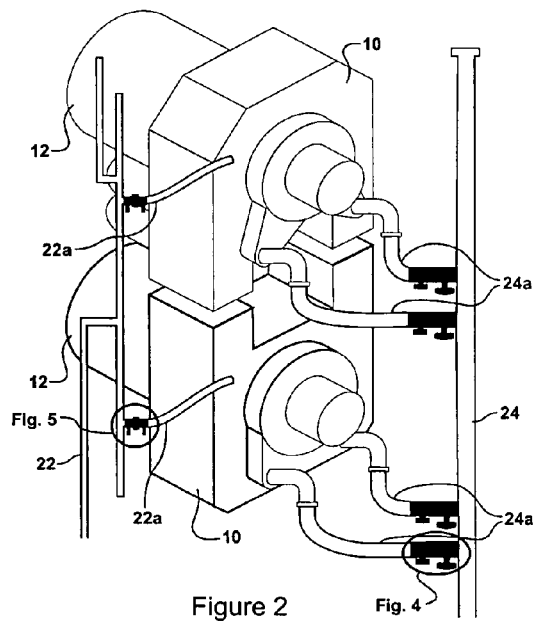
Figure 2
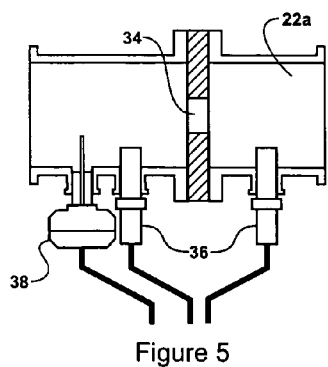
Figure 5
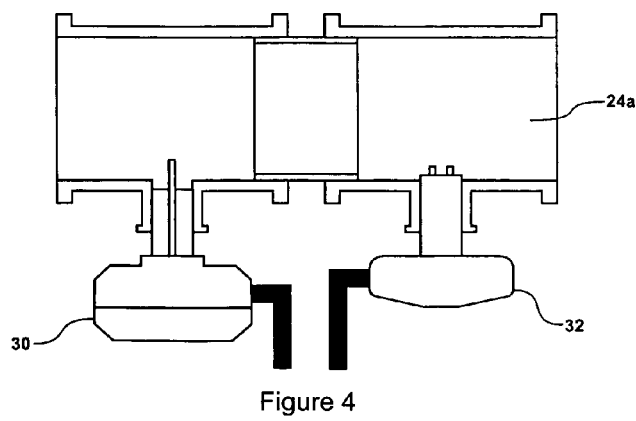
Figure 4
Figure 1

MONITORING AND ALARM SYSTEM FOR ROLLING MILL OIL FILM BEARINGS

BACKGROUND OF THE INVENTION

1. Field of the Invention

This invention relates generally to rolling mill oil film bearings, and is concerned in particular with a system for monitoring and interpreting various parameters representative of bearing operating conditions, and for generating appropriate alarms when such parameters are out of defined safe ranges.

2. Description of the Prior Art

In a typical rolling mill installation, the necks of the rolls are rotatably supported in bearings, and in many cases those bearings are oil film bearings. Oil film bearings include sleeves received on and fixed relative to the roll necks. The sleeves are journalled for rotation in bushings fixed within chocks, the latter being supported in roll housings. A flow of oil is introduced between the sleeves and bushings, allowing the sleeves to rotate on films of oil hydrodynamically maintained at the bearing load zones.

The mill lubrication system includes a reservoir of oil remote from the roll stands. Oil is pumped from the reservoir through filters and a heat exchanger before being delivered to the bearings, and is returned from the bearings through a drainage network back to the reservoir.

Those skilled in the art have long recognized that certain parameters of the lubrication system are indicative of bearing operating conditions. These parameters include the pressures and temperatures of oil entering the bearings, bushing temperatures, and the temperatures and flow rates of oil exiting the bearings. However, a comprehensive system has yet to be provided for monitoring and interpreting signals representative of such parameters, and for generating appropriate warnings when those parameters drift outside of safe operational ranges.

SUMMARY OF THE INVENTION

The objective of the present invention is to provide a system for monitoring a plurality of diverse parameters indicative of bearing operating conditions. The system interprets the thus monitored parameters and triggers warnings to operating personnel when a bearing is in danger of being damaged by continued use.

This and other objectives and advantages are realized with an embodiment of the invention to be described hereinafter in more detail with reference to the accompanying drawings wherein:

BRIEF DESCRIPTION OF THE DRAWINGS

FIG. 1 is a schematic illustration showing the oil film bearings of one mill stand in association with the mill lubrication system;

FIG. 2 is an enlarged view of the bearings on one side of the mill stand;

FIG. 3 illustrates the location of temperature transducers in the bushing of a bearing;

FIG. 4 is an enlarged view of the drain transducers;

FIG. 5 is an enlarged view of the inlet transducers; and

DETAILED DESCRIPTION OF PREFERRED EMBODIMENT

Figure 6:
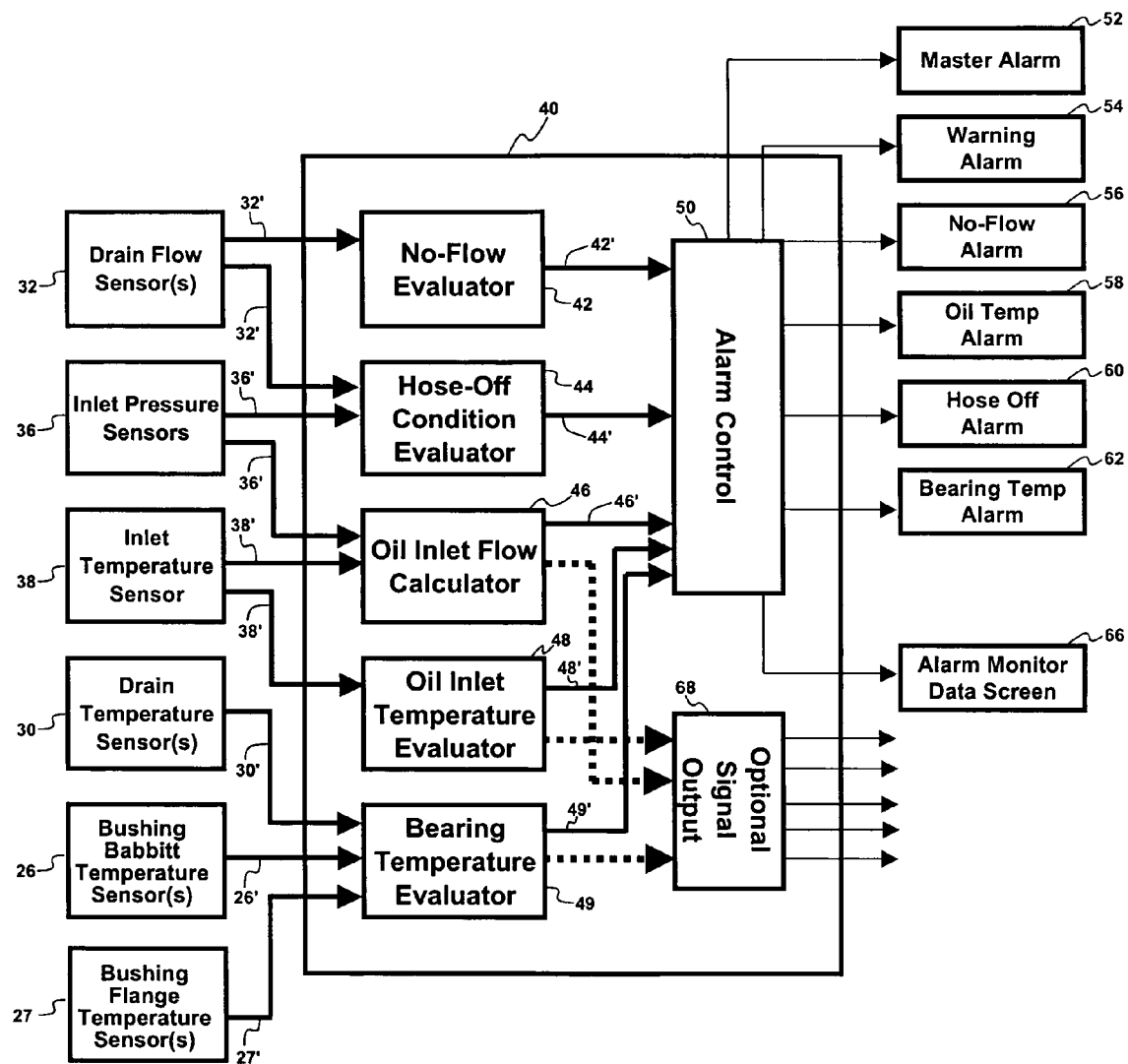
FIG. 6 is a block diagram illustrating an embodiment of a control unit in accordance with the present invention.

With reference initially to FIGS. 1 and 2, oil film bearings 10 are shown supporting the necks of rolls 12 on the thrust and non-thrust sides of a typical mill stand. Those skilled in the art will understand that the rolls 12 have been split and angled to accommodate a three dimensional illustration in a single view.

The oil film bearings 10 may be of the types known to those skilled in the art, as illustrated for example in any one of U.S. Pat. Nos. 6,468,194; 4,575,638; 6,149,309 and 6,123,461, the descriptions of which are herein incorporated by reference.

The mill lubrication system includes a remote reservoir 14 containing a supply of lubricating oil. The oil is drawn from the reservoir by pumps 16 and delivered through filters 18 and a heat exchanger 20 to the bearings 10 via feed piping 22 that includes branch feed lines 22a connected to the bearings by flexible hoses. Oil is returned to the reservoir 14 via return piping 24 that includes branch drain lines 24a also connected to the bearings by flexible hoses.

The system of the present invention includes sensors strategically placed to monitor diverse parameters indicative of bearing operating conditions. For example, and as shown in FIGS. 2-5, these include:

(1) first sensors in the form of flow transducers 32 in the branch drain lines 24a for measuring the flow of oil draining from the bearings and for generating first status signals 32' representative of that flow;

(2) second sensors in the form of restricted orifices 34 in the branch feed lines 22a in conjunction with pressure transducers 36 to measure the theoretical flow rate of oil being delivered to the bearings and for generating second status signals 36' representative of that flow rate;

(3) third sensors in the form of temperature transducers 38 in the branch feed lines 22a for measuring the temperature of the oil being delivered to the bearings and for generating third status signals 38' representative of that temperature;

(4) fourth sensors in the form of temperature transducers 30 in the branch drain lines 24a for measuring the temperature of the oil draining from the bearings and for generating fourth status signals 30' representative of that temperature; and (5) fifth sensors in the form of temperature transducers 26 and 27 in the bushings 28 of the bearings. Sensors 26 are for measuring the temperature of the bearings at the bearing load zones and for generating fifth status signals 26' representative of that temperature. Sensor 27 is for measuring the bushing flange temperature and for generating sixth status signal 27' representative of the flange temperature. The system is designed to optionally use either type of bushing temperature sensor, or can be optionally operated with no temperature sensing in the bushing.

As shown in FIG. 6, the system of the present invention features a controller 40. The controller samples signals provided by the above-described sensors and utilizes evaluators and a calculator to determine specific information about the operating characteristics of the bearings.

More particularly, the controller includes:

(1) a first "No-Flow Evaluator" 42 responsive to the first status signals 32' and serving to trigger a first alarm signal 42' in the event that the oil flow in the branch drain lines 24a is less than that required to properly lubricate the bearings;

(2) a second "Hose-Off Condition Evaluator" 44 responsive the first and second status signals 32', 36' and serving to trigger a second alarm signal 44' in the event that the flexible hoses of the branch feed lines 22a or the branch drain lines 24a become disconnected from the bearings;

(3) an "Oil Inlet Flow Calculator" 46 responsive to the second and third status signals 36', 38' and serving to trigger a third alarm signal 46' in the event that the rate of oil flow in the branch feed lines 22a is less than that required to properly lubricate the bearings (4) a third "Oil Inlet Temperature Evaluator" 48 responsive to the third status signals 38' and serving to trigger a fourth alarm signal 48' in the event that the oil being delivered via the branch feed lines 22a is outside of an appropriate range required to properly lubricate the bearings; and (5) a fourth "Bearing Temperature Evaluator" 49 responsive to the fourth, fifth, and sixth status signals 30', 26', 27' and serves to trigger a fifth alarm signal 49' in the event that the temperature of the bearings exceeds a safe operating range.

The evaluators 42, 44, 48, and 49 may be comparators, calculators, logic circuits or the like known to those skilled in the art. Alarm signals from the evaluators and calculator are received by an alarm control 50. The alarm control in turn can activate any of a number of a plurality of alarms 52-62.

Any event that exceeds the limit for safe operation triggers a Master Alarm 52, which warns operating personnel that the mill should be shut down as soon as possible to avoid damage to the bearings.

Any event that exceeds the recommended operating limits triggers a Warning Alarm 54, indicating that an operational condition of a bearing should be investigated, but that the condition is not serious enough to warrant mill shut down.

If the No-Flow Evaluator 42 shows an "OFF" condition, then the Master Alarm 52 is triggered. A No-Flow Alarm 56 is also triggered.

If the Oil Inlet Temperature Evaluator 48 determines that the oil inlet temperature is outside of a recommended range, then an Oil Temperature Alarm 58 is triggered, as is the Warning Alarm 54.

If the No-Flow Evaluator 42 indicates lack of drain flow, and inlet oil flow is calculated to be significant, then the Hose-Off Alarm 60 is triggered, as is the Master Alarm 52.

If the temperature of oil exiting the bearing or the load zone or bushing flange temperatures are above safe levels, then the Bearing Temperature Alarm 62 and the Master Alarm 52 are triggered.

A monitor 66 can optionally inform the operator of the mill of the exact cause of any alarm condition.

As indicated at 68, the system optionally has the capability of responding to various evaluator and/or calculator outputs by generating other signals, including for example informational data such as bushing temperatures, oil temperatures, etc.

We claim:

1. In a rolling mill in which oil is pumped from a reservoir via feed piping and branch feed lines to oil film bearings and oil is returned from the bearings via branch drain lines and return piping to the reservoir, a monitoring and alarm system comprising:

first sensors in said branch drain lines for measuring the flow of oil draining from said bearings and for generating first status signals representative thereof;

second sensors in said branch feed lines for measuring the theoretical flow rate of oil being delivered to said bearings and for generating second status signals representative thereof;

third sensors in said branch feed lines for sensing the temperature of oil being delivered to said bearings and for generating third status signals representative thereof;

alarms for alerting mill operating personnel that individual bearings are in danger of being damaged by continued operation; and a controller having a first evaluator responsive to said first status signals for activating said alarms in the event that the flow of oil in said branch drain lines is less than that required to properly lubricate said bearings, and having a calculator responsive to said second and third status signals for calculating the rate of flow of oil to said bearings and for activating said alarms in the event that said rate of flow is less than that required to properly lubricate said bearings.

2. The system of claim 1 wherein said branch feed lines and said branch drain lines include flexible hoses connected to said bearings, and said controller further comprises a second evaluator responsive to said first and second status signals for determining if said flexible hoses have become disconnected from said bearings and for activating said alarms in the event of such disconnection.

3. The system of claim 2 wherein said controller further comprises a third evaluator responsive to said third status signals for activating said alarms in the event that the temperature of the oil being delivered to said bearings is outside an appropriate range required to properly lubricate said bearings.

4. The system of claim 1 further comprising fourth sensors in said branch drain for measuring the temperature of the oil draining from said bearings and for generating fourth status signals representative thereof, said controller having a fourth evaluator responsive to said fourth status signal for activating said alarms in the event that the temperature of said bearings exceeds a safe operating range.

5. The system of claim 4 further comprising fifth sensors for measuring the temperature of said bearings at their respective load zones and for generating fifth status signals representative thereof, said controller having a fourth evaluator responsive to said fifth status signals for activating said alarms in the event that the temperature of said bearings exceeds safe operating range.

6. The system of claim 5 further comprising sixth sensors for measuring the temperatures of said bearings at their respective flanges and for generating sixth status signals representative thereof, said controller having a fourth evaluator responsive to said sixth status signals for activating said alarms in the event that the temperature of said bearings exceeds a safe operating range.

7. The system of claim 1 comprising fourth sensors in said branch drain for measuring the temperature of the oil draining from said bearings and for generating fourth status signals representative thereof, fifth sensors for measuring the temperature of said bearings at their respective load zones and for generating fifth status signals representative thereof, sixth sensors for measuring the temperature of said bearings at their respective flanges and for generating sixth status signals representative thereof, said controller having a fourth evaluator optionally responsive to one or more of said fourth, fifth, and sixth status signals for activating said alarms in the event that the temperature of said bearings exceeds a safe operating range.

* * * * *